United States Patent
Fujimoto et al.

(10) Patent No.: US 12,345,302 B2
(45) Date of Patent: Jul. 1, 2025

(54) CLUTCH CONTROL DEVICE

(71) Applicant: HONDA MOTOR CO., LTD., Tokyo (JP)

(72) Inventors: Yasushi Fujimoto, Tokyo (JP); Yoshiaki Tsukada, Tokyo (JP); Junya Ono, Tokyo (JP); Takashi Ozeki, Tokyo (JP); Koichi Furusato, Tokyo (JP); Yuma Kaibe, Tokyo (JP); Ryohei Tsuzuki, Tokyo (JP); Tatsuya Ryuzaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/284,545

(22) PCT Filed: Mar. 8, 2022

(86) PCT No.: PCT/JP2022/010033
§ 371 (c)(1),
(2) Date: Sep. 28, 2023

(87) PCT Pub. No.: WO2022/209632
PCT Pub. Date: Oct. 6, 2022

(65) Prior Publication Data
US 2025/0084902 A1    Mar. 13, 2025

(30) Foreign Application Priority Data

Mar. 31, 2021 (JP) ................. 2021-062275

(51) Int. Cl.
*F16D 48/06* (2006.01)
(52) U.S. Cl.
CPC ...... *F16D 48/06* (2013.01); *F16D 2500/1023* (2013.01); *F16D 2500/1117* (2013.01); *F16D 2500/3022* (2013.01)

(58) Field of Classification Search
CPC ............ F16D 48/06; F16D 2500/1023; F16D 2500/1117; F16D 2500/3022
See application file for complete search history.

(56) References Cited

U.S. PATENT DOCUMENTS 3,245,502 A * 4/1966 Randol .................. F16D 48/06
    192/101
4,895,236 A    1/1990 Sakakibara et al.
(Continued)

FOREIGN PATENT DOCUMENTS

DE    10252570    5/2004
JP    63-186037    8/1988
(Continued)

OTHER PUBLICATIONS

International Search Report and Written Opinion for International Application No. /JP2022/010033 filed o mailed on Jun. 14, 2022, 9 pages.
(Continued)

*Primary Examiner* — Edwin A Young
(74) *Attorney, Agent, or Firm* — Amin, Turocy & Watson, LLP

(57) ABSTRACT

This clutch control device includes a clutch apparatus configured to connect and disconnect power transmission between a prime mover and an output target, a clutch actuator configured to output a driving force for actuating the clutch apparatus, and a driving mechanism configured to receive the driving force of the clutch actuator and actuate the clutch apparatus, and the driving mechanism is able to apply a driving force in either a disconnecting direction or a connecting direction to the clutch apparatus.

4 Claims, 9 Drawing Sheets

(56) References Cited

U.S. PATENT DOCUMENTS

| | | | | |
|---|---|---|---|---|
| 5,847,272 A | * | 12/1998 | Schneider | F16D 48/066 |
| | | | | 73/115.03 |
| 2004/0157704 A1 | * | 8/2004 | Stork | F16D 48/062 |
| | | | | 477/166 |
| 2007/0244617 A1 | | 10/2007 | Zenno | |

FOREIGN PATENT DOCUMENTS

| | | |
|---|---|---|
| JP | 63-203958 | 8/1988 |
| JP | 2005-106246 | 4/2005 |
| JP | 2007-285447 | 11/2007 |
| JP | 2008-215477 | 9/2008 |
| JP | 2012-252390 | 12/2012 |

OTHER PUBLICATIONS

International Search Report for International Application No. PCT/JP2022/010033 mailed on May 17, 2022, 4 pages.
International Preliminary Report on Patentability for International Application No. PCT/JP2022/010033 mailed on Jul. 18, 2023, 12 pages.
German Office Action for German Patent Application No. 112022000753.2 mailed Feb. 6, 2025.

\* cited by examiner

CLUTCH CONTROL DEVICE

TECHNICAL FIELD

The present invention relates to a clutch control device.

The present application claims priority based on Japanese Patent Application No. 2021-062275 filed on Mar. 31, 2021, the contents of which are incorporated herein by reference.

BACKGROUND ART

In a saddle riding vehicle in recent years, an automatic clutch system configured to automatically perform a connection/disconnection operation of a clutch apparatus through electrical control has been proposed (for example, see Patent Document 1).

RELATED ART DOCUMENT

Patent Document

Patent Document 1: Japanese Unexamined Patent Application, First Publication No. 2005-106246

SUMMARY

Problems to be Solved by the Invention

In technologies in the related art, a clutch apparatus can be driven on an opening side (disconnection side) only. Meanwhile, the clutch capacity needs to be set to be large enough such that sliding does not occur when a large amount of torque is applied to the clutch apparatus. For this reason, in a normally closed clutch apparatus, a clutch spring with a large load is used. In order to disconnect such a clutch apparatus, it is necessary to increase the output of the clutch actuator, which poses a problem in terms of efficiency of the system.

In consideration of the above-mentioned circumstances, the present invention is directed to constituting an automatic clutch system efficiently in a clutch control device that controls connection/disconnection of a clutch apparatus.

Means for Solving the Problem

As means for solving the above-mentioned problems, an aspect of the present invention includes a clutch apparatus configured to connect and disconnect power transmission between a prime mover and an output target; a clutch actuator configured to output a driving force for actuating the clutch apparatus; and a driving mechanism configured to receive the driving force of the clutch actuator and actuate the clutch apparatus, the driving mechanism being able to apply a driving force in either a disconnecting direction or a connecting direction to the clutch apparatus, in which the clutch actuator applies the driving force in a clutch connecting direction to the clutch apparatus according to an operation situation of the prime mover, the clutch apparatus includes a spring member configured to generate a pressing force in the clutch connecting direction, the clutch actuator applies the driving force in the clutch connecting direction to the clutch apparatus by a driving source separate from the spring member, in addition to a biasing force of the spring member, only in a previously determined operation situation of the prime mover, the driving mechanism includes a first transmission member on a side of the clutch actuator and a second transmission member on a side of the clutch apparatus, and the first transmission member is in constant mechanical engagement with the second transmission member.

According to this configuration, since the driving mechanism between the clutch actuator and the clutch apparatus can also apply a driving force in either the disconnecting direction or the connecting direction to the clutch apparatus, the following effects are provided. That is, for example, the clutch capacity can be increased by applying a driving force in the connecting direction to the clutch apparatus in the clutch connected state. For this reason, for example, when transmitting a large torque from the prime mover to the output target (when a clutch capacity higher than normal is required), or the like, it is possible to increase the clutch capacity in a limited manner. Accordingly, compared to using a clutch spring with a large load, it is possible to suppress the output of the clutch actuator required for normal clutch disconnection. For this reason, the automatic clutch system can be configured efficiently, such as by achieving reduction in size and weight of the clutch actuator.

According to this configuration, while suppressing the capacity of the clutch apparatus, the clutch connected state corresponding to the output of the prime mover is maintained. Accordingly, cost reduction is possible.

According to this configuration, only in a predetermined operational situation of the prime mover (for example, when the output of the prime mover is high), the clutch actuator applies the driving force to the clutch apparatus in addition to the biasing force of the spring member. For this reason, actuation of the actuator can be suppressed as much as possible.

In the above-mentioned aspect, the clutch control device may be applied to a vehicle, and the clutch actuator may apply the driving force in a clutch connecting direction to the clutch apparatus during acceleration of the vehicle.

According to this configuration, by increasing the clutch capacity during acceleration of the vehicle, it is possible to suppress the sliding of the clutch apparatus and transmit a large torque. In normal times when the transmission torque is low, the output of the clutch actuator required for clutch disconnection can be suppressed.

According to this configuration, the first transmission member on the side of the clutch actuator and the second transmission member on the side of the clutch apparatus in the driving mechanism are always meshed with each other. Accordingly, driving forces in the disconnecting direction and the connecting direction can be easily applied to the clutch apparatus by forward and reverse driving of the clutch actuator.

In the above-mentioned aspect, the driving mechanism may constitute a rack and pinion configured to convert rotational movement of the first transmission member into reciprocal movement of the second transmission member, and a pinion gear included in the driving mechanism may be formed in a fan shape when seen in an axial direction.

According to this configuration, the driving mechanism is easily constituted by the rack and pinion. The pinion gear of the driving mechanism is a sector gear with a notched part in the circumferential direction. Accordingly, reduction in size of the driving mechanism can be achieved.

In the above-mentioned aspect, the clutch actuator may include a driving source configured to output the driving force and a transmission mechanism configured to link the driving source and the clutch apparatus, the driving source and the first transmission member that is an output member of the transmission mechanism may be arranged in a first direction, and the second transmission member that is an input member of the clutch apparatus may be disposed between the driving source and the first transmission member in the first direction.

According to this configuration, since the input member (second transmission member) of the clutch apparatus is disposed between the driving source and the output member (first transmission member) of the clutch actuator, the following effects are provided. That is, in general, the input member is disposed at an axial center of the clutch apparatus. The driving source and the output member of the clutch actuator are distributed and arranged on both sides of this input member sandwiched therebetween in the first direction. Accordingly, the clutch actuators can be arranged efficiently and in a well-balanced manner.

Advantage of the Invention

According to the present invention, in a clutch control device configured to control connection/disconnection of a clutch apparatus, an automatic clutch system can be efficiently constituted.

DESCRIPTION OF THE EMBODIMENTS

Figure 1:
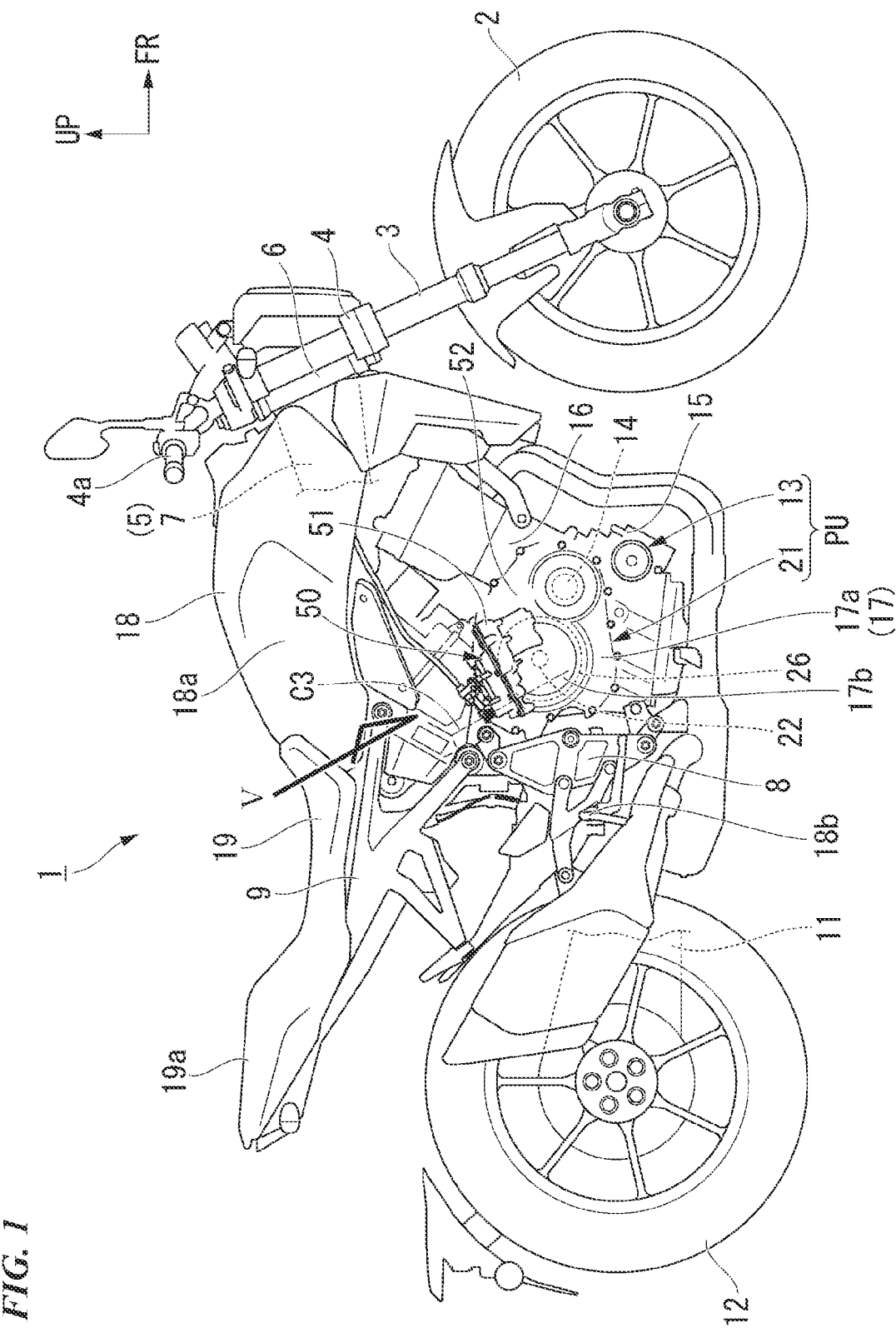
FIG. 1 is a right side view of a motorcycle of an embodiment.

Hereinafter, an embodiment of the present invention will be described with reference to the accompanying drawings. Further, unless otherwise specified, directions such as forward, rearward, leftward, rightward, and the like, in the following description are the same as the directions in a vehicle described below. In addition, in appropriate places in the drawings used in the following description, an arrow FR indicates a forward direction of the vehicle, an arrow LH indicates a leftward direction of the vehicle, and an arrow UP indicates an upward direction of the vehicle.
<Entire Vehicle>

As shown in FIG. 1, the embodiment is applied to a motorcycle 1 as an example of a saddle riding vehicle. A front wheel 2 of the motorcycle 1 is supported by lower end portions of a pair of left and right front forks 3. Upper portions of the left and right front forks 3 are supported by a head pipe 6 of a front end portion of a vehicle body frame 5 via a steering stem 4. A bar type steering handle 4a is attached onto a top bridge of the steering stem 4.

The vehicle body frame 5 includes the head pipe 6, a main frame 7 extending downward and rearward from the head pipe 6 at a center in the vehicle width direction (leftward/rightward direction), a pivot frame 8 provided below a rear end portion of the main frame 7, and a seat frame 9 continuous with a side behind the main frame 7 and the pivot frame 8. A front end portion of a swing arm 11 is swingably supported on the pivot frame 8. A rear wheel 12 of the motorcycle 1 is supported on a rear end portion of the swing arm 11.

A fuel tank 18 is supported above the left and right main frames 7. A front seat 19 and a rear seat 19a are supported behind the fuel tank 18 and above the seat frame 9. Knee grip portions 18a recessed inward in the vehicle width direction are formed on both left and right sides of a rear portion of the fuel tank 18. The left and right knee grip portions 18a are formed to match the following areas. These areas are inside around left and right knees of a driver sitting on the front seat 19. Steps 18b are supported on left and right sides below the front seat 19. The driver puts his/her feet in front of ankles on the steps 18b.

A power unit PU including a prime mover of the motorcycle 1 is suspended below the main frame 7. The power unit PU integrally has an engine (internal combustion engine, prime mover) 13 located in the front thereof, and a gearbox 21 located in the rear thereof. For example, the engine 13 is a multi-cylinder engine in which a rotary shaft of a crankshaft 14 is aligned with a leftward/rightward direction (vehicle width direction).

The engine 13 has a cylinder 16 standing above a front portion of a crank case 15. A rear portion of the crank case 15 is a gearbox case 17 that accommodates the gearbox 21. A right cover 17a crossing over a right side portion of the gearbox case 17 is attached to a right side portion of the crank case 15. The right cover 17a is a clutch cover configured to cover a clutch apparatus 26. The power unit PU is linked to the rear wheel 12 via, for example, a chain type transmission mechanism (not shown).
<Gearbox>

Figure 2:
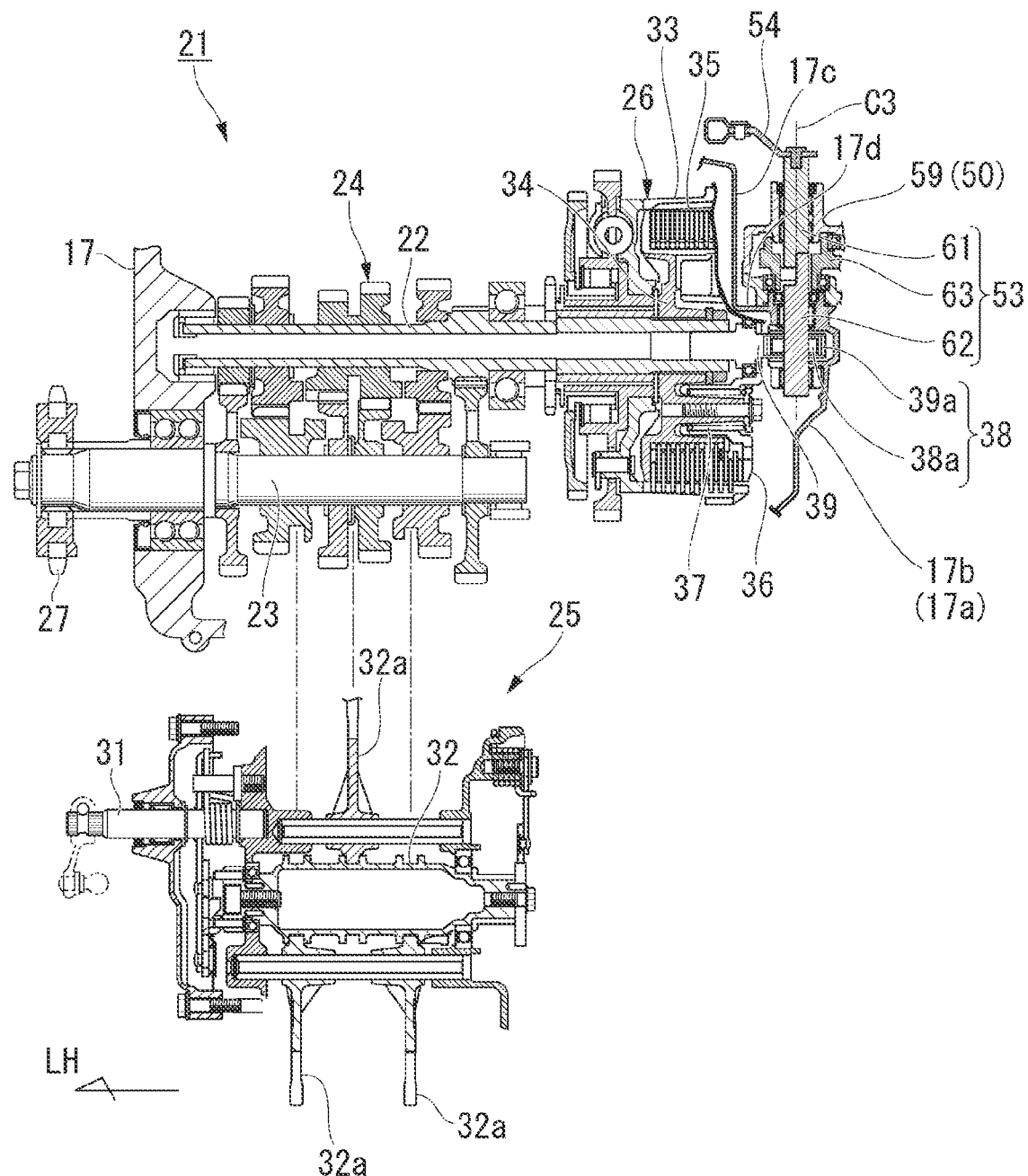
FIG. 2 is a cross-sectional view of a gearbox and a change mechanism of the motorcycle.

Referring also to FIG. 2, the gearbox 21 is a stepped transmission. The gearbox 21 has a main shaft 22 and a counter shaft 23, and a shifting gear group 24 bridging between both the shafts 22 and 23. The counter shaft 23 constitutes an output shaft of the gearbox 21 and the power unit PU. A left end portion of the counter shaft 23 protrudes leftward from a rear portion of the gearbox case 17 and is connected to the rear wheel 12 via the chain type transmission mechanism.

The main shaft 22 and the counter shaft 23 of the gearbox 21 are disposed behind the crankshaft 14. The clutch apparatus 26 is disposed coaxially with a left end portion of the main shaft 22. The clutch apparatus 26 connects and disconnects power transmission between the crankshaft 14 of the engine 13 and the main shaft 22 of the gearbox 21. The clutch apparatus 26 is connected and disconnected by at least one of an operation of a clutch operator (for example, a clutch lever (not shown)) by an occupant and an actuation of a clutch actuator 50, which will be described below.

The clutch apparatus 26 is, for example, a wet multi-plate clutch, a so-called normally closed clutch. A rotational moving force of the crankshaft 14 is transmitted to the main shaft 22 via the clutch apparatus 26, and transmitted to the counter shaft 23 from the main shaft 22 via an arbitrary gear pair of the shifting gear group 24. A drive sprocket 27 of the chain type transmission mechanism is attached to a left end portion of the counter shaft 23 protruding leftward from the rear portion of the crank case 15.

A change mechanism 25 configured to switch a gear pair of the shifting gear group 24 is accommodated in the gearbox case 17 in the vicinity of the gearbox 21. The change mechanism 25 has a hollow cylindrical shift drum 32 parallel to both the shafts 22 and 23. The change mechanism 25 actuates a plurality of shift forks 32a using rotation of the shift drum 32. This actuation is performed according to a pattern of a lead groove formed in an outer circumference of the shift drum 32. This actuation causes the change mechanism 25 to switch the gear pairs used for power transmission between both the shafts 22 and 23 in the shifting gear group 24.

Here, in the motorcycle 1, only a gear shifting operation (a foot operation of a shift pedal (not shown)) of the gearbox 21 is performed by a driver, and a connection/disconnection operation of the clutch apparatus 26 is automatically performed by electrical control according to the operation of the shift pedal. That is, the motorcycle 1 employs a so-called semi-automatic gear shifting system (automatic clutch type gear shifting system).

<Gear Shifting System>

Figure 3:
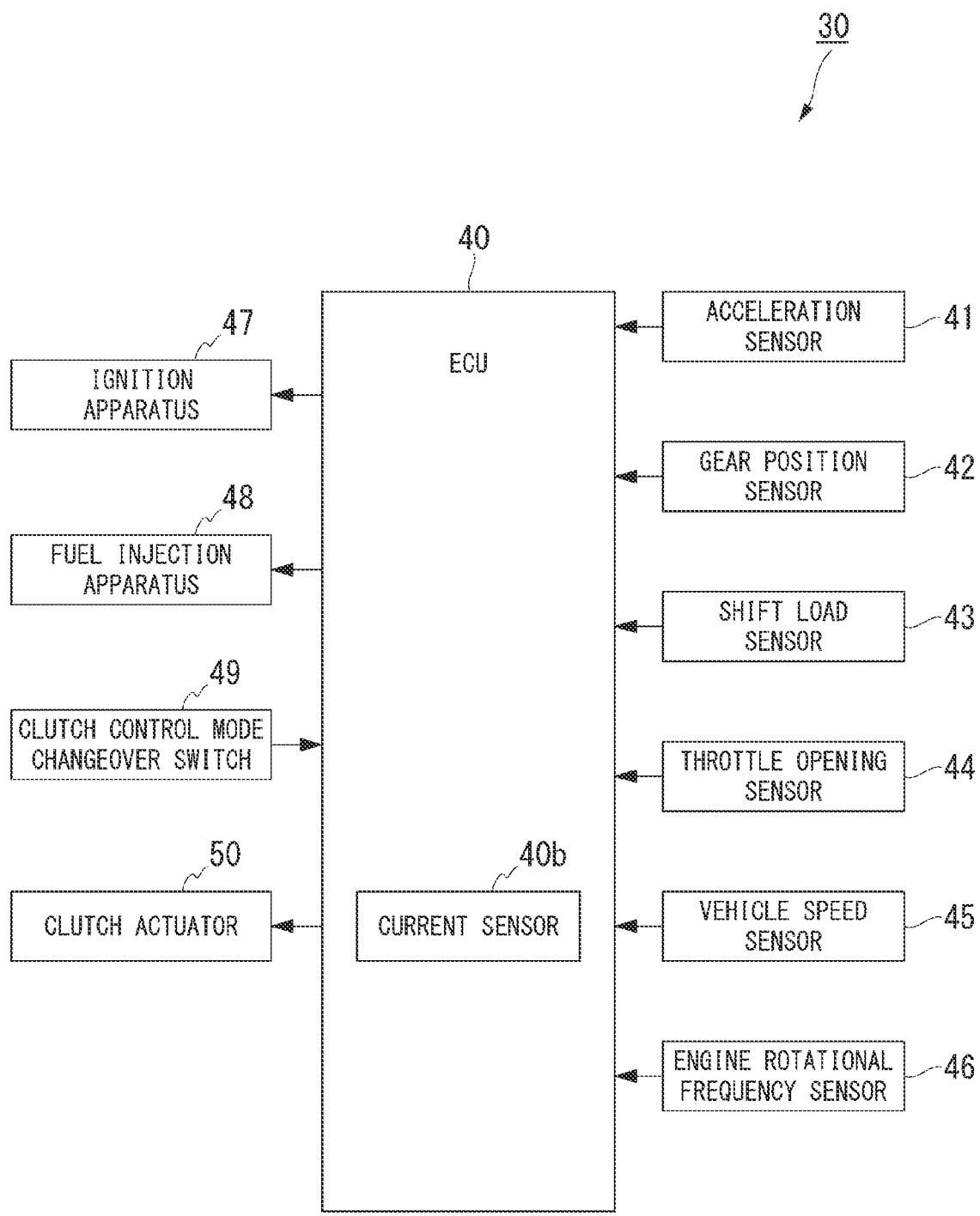
FIG. 3 is a block diagram of a gear shifting system of the motorcycle.

As shown in FIG. 3, the gear shifting system 30 includes the clutch actuator 50, an electronic control unit (ECU, control unit) 40, various sensors 41 to 46, and various apparatuses 47, 48 and 50.

The ECU 40 controls actuation of an ignition apparatus 47 and a fuel injection apparatus 48, and actuation of the clutch actuator 50. This control is performed on the basis of detection information from an acceleration sensor 41, a gear position sensor 42 and a shift load sensor 43 (for example, torque sensor), various vehicle state detection information from a throttle opening sensor 44, a vehicle speed sensor 45 and an engine rotational frequency sensor 46, and the like.

The acceleration sensor 41 detects a behavior of a vehicle body. The gear position sensor 42 detects a variable speed level from a rotational angle of the shift drum 32. The shift load sensor 43 detects an operation torque input to a shift spindle 31 (see FIG. 2) of the change mechanism 25. The throttle opening sensor 44 detects a throttle opening. The vehicle speed sensor 45 detects a vehicle speed. The engine rotational frequency sensor 46 detects an engine rotational frequency.

Figure 5:
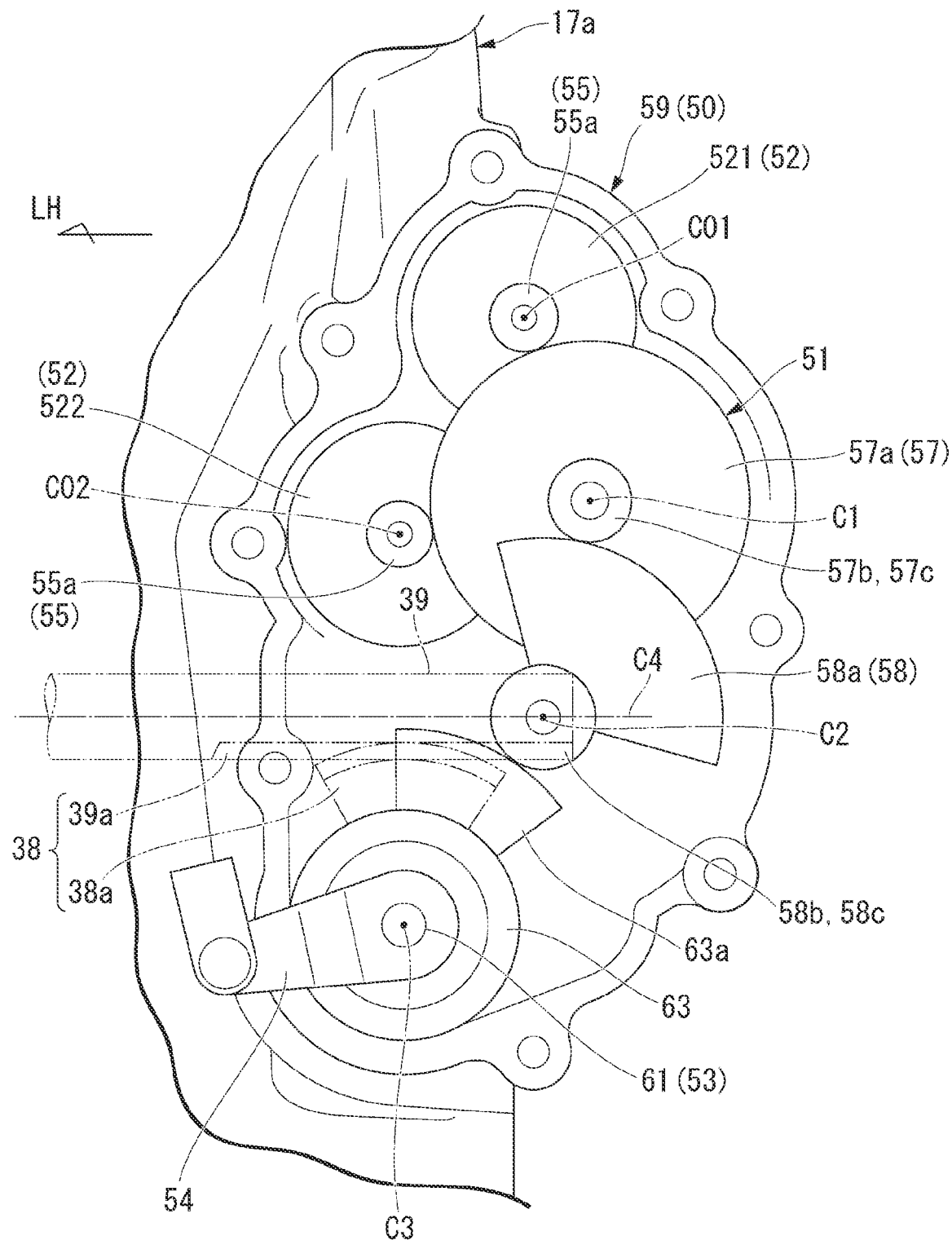
FIG. 5 is a view along an arrow V in FIG. 1 showing a clutch actuator seen in an axial direction.
Figure 6:
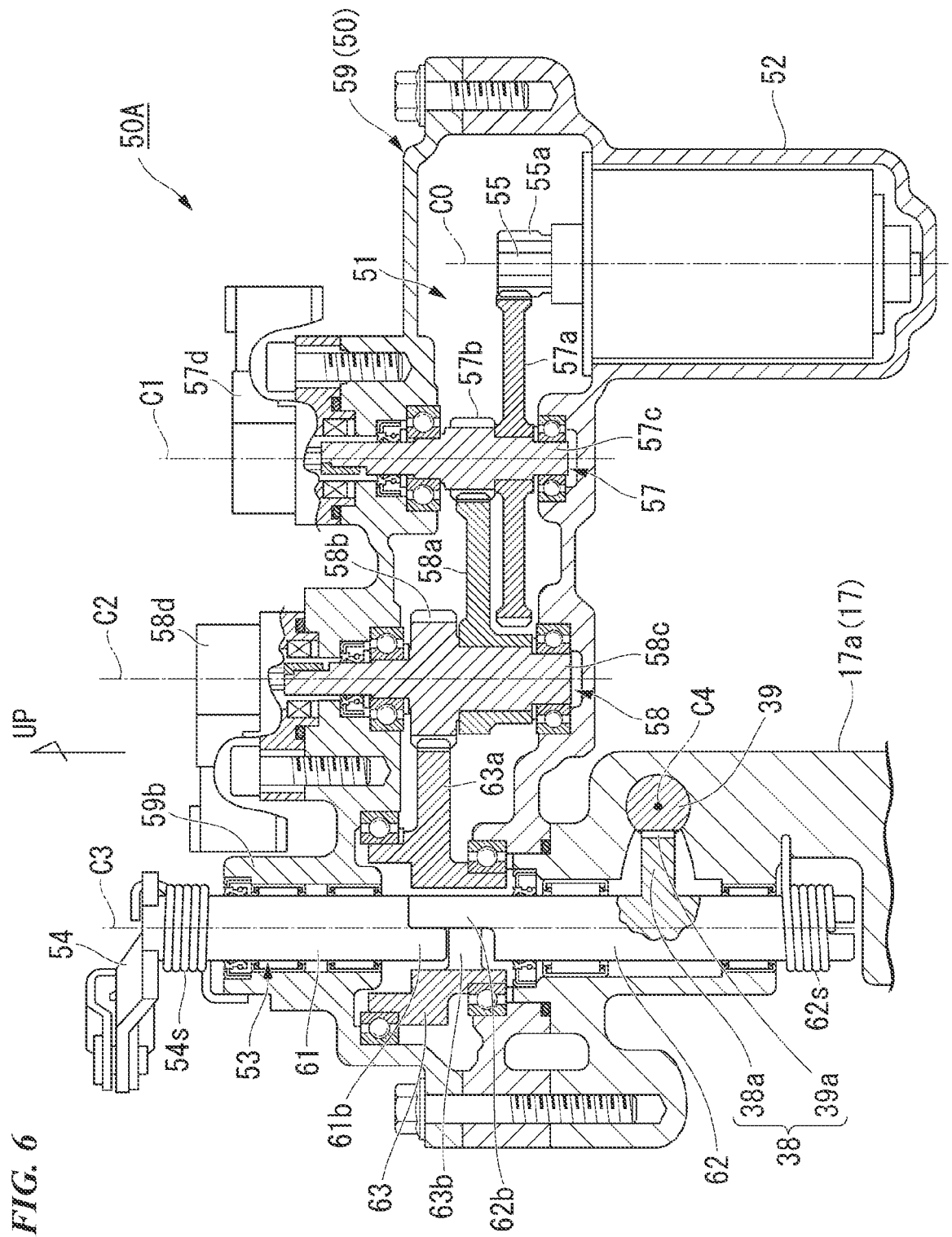
FIG. 6 is a deployed cross-sectional view of the clutch actuator in the axial direction.

Referring to FIG. 5 and FIG. 6 together, the clutch actuator 50 controls a working torque applied to a release shaft 53 in order to connect and disconnect the clutch apparatus 26. The clutch actuator 50 includes an electric motor 52 (hereinafter, simply referred to as the motor 52) as a driving source, and a speed reduction mechanism 51 configured to transmit a driving force of the motor 52 to the release shaft 53.

The ECU 40 calculates the following current value on the basis of a preset calculation program. This current value is a value of current supplied to the motor 52 in order to connect and disconnect the clutch apparatus 26. The current supplied to the motor 52 is obtained from a correlation with the torque output to the motor 52. A target torque of the motor 52 is proportional to a working torque (a driven clutch lever torque, which will be described below) applied to the release shaft 53. A value of the current supplied to the motor 52 is detected by a current sensor 40b included in the ECU 40. According to the change of the detection value, actuation of the clutch actuator 50 is controlled. The clutch actuator 50 will be described below in detail.

<Clutch Apparatus>

Figure 11:
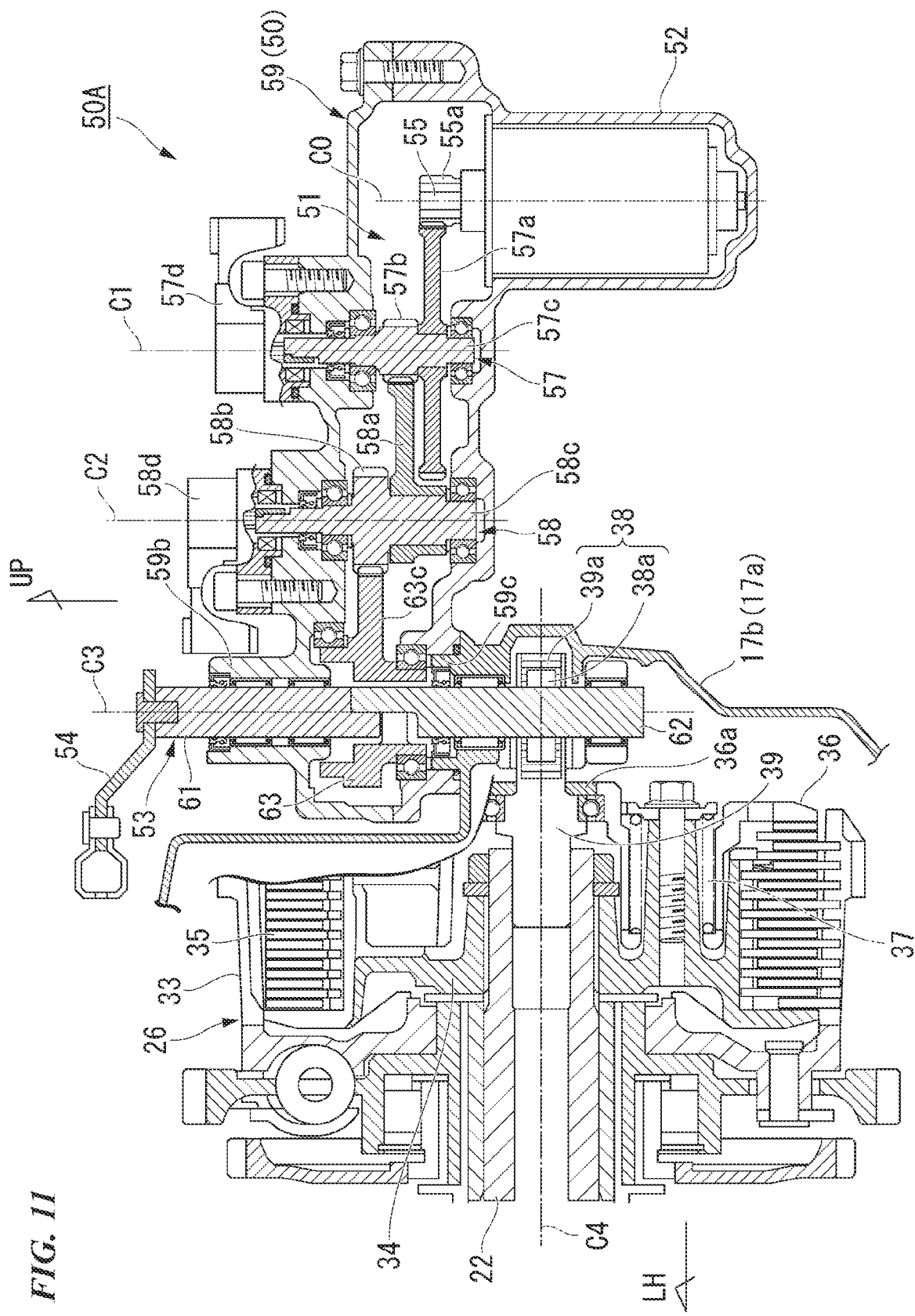
FIG. 11 is a cross-sectional view corresponding to FIG. 6 in a state in which the clutch actuator is attached to a right cover.

As shown in FIG. 2 and FIG. 11, the clutch apparatus 26 of the embodiment is a multi-plate clutch obtained by stacking a plurality of clutch plates 35 in the axial direction, and a wet clutch disposed in an oil chamber in the right cover 17a. The clutch apparatus 26 includes an outer clutch 33, a center clutch 34, and the plurality of clutch plates 35.

The outer clutch 33 is driven by receiving a rotational moving force normally transmitted from the crankshaft 14. The center clutch 34 is disposed inside the outer clutch 33 and integrally rotatably supported by the main shaft 22. The plurality of clutch plates 35 are stacked between the outer clutch 33 and the center clutch 34 and frictionally engaged with each other.

A pressure plate 36 having substantially the same diameter as the clutch plates 35 is disposed on a right side of the stacked clutch plates 35 (an outer side in the vehicle width direction). The pressure plate 36 is biased leftward by receiving an elastic load of a clutch spring 37, and the stacked clutch plates 35 are pressure-welded (frictionally engaged). Accordingly, the clutch apparatus 26 is in a connected state in which power transmission is possible.

The clutch apparatus 26 is a normally closed clutch that is in a connected state at normal times when there is no input from the outside.

Release of the pressure welding (frictional engagement) is performed by actuation of a release mechanism (driving mechanism) 38 inside the right cover 17a. The release mechanism 38 is a mechanism configured to actuate the clutch apparatus 26 in a disconnecting direction. The release mechanism 38 is a mechanism configured to bias the clutch apparatus 26 in a connecting direction due to reverse driving of the clutch actuator 50. The actuation of the release mechanism 38 is performed by at least one of the operation of the clutch lever (not shown) by an occupant and application of a torque by forward rotation driving of the clutch actuator 50.

<Release Mechanism>

As shown in FIG. 2 and FIG. 11, the release mechanism 38 includes a lifter shaft 39, and the release shaft 53.

The lifter shaft 39 is held in the right side portion of the main shaft 22 to be reciprocally movable in the axial direction. The release shaft 53 is disposed with an axial direction perpendicular to the lifter shaft 39, and held pivotably around an axis on an outer side portion of the right cover 17a.

Line C3 in the drawings shows a center axis of the release shaft 53 extending in an upward/downward direction, and line C4 shows a center axis of the lifter shaft 39 perpendicular to the release shaft 53. The lifter shaft 39 is disposed below the speed reduction mechanism 51.

The release shaft 53 is inclined rearward in the axial direction to be disposed rearward as it goes upward in the vertical direction when seen in the axial direction of the main shaft 22 (when seen in a side view of the vehicle) (see FIG. 1). The upper portion of the release shaft 53 protrudes outward from the right cover 17a, and a driven clutch lever 54 is integrally rotatably attached to the upper portion of the release shaft 53. The driven clutch lever 54 is connected to the clutch lever via an operation cable (not shown).

Referring also to FIG. 5, a driving gear 38a is integrally rotatably provided in a lower portion of the release shaft 53 located inside the right cover 17a. The driving gear 38a is a sector gear about the release shaft 53. The driving gear 38a is provided to spread in front of the release shaft 53. The lifter shaft 39 is disposed in front of the driving gear 38a. A rack gear 39a having gear teeth arranged in the axial direction is formed in the rear portion of the lifter shaft 39. The driving gear 38a functions as a pinion gear meshed with the rack gear 39a.

A rack and pinion is constituted by the driving gear 38a and the rack gear 39a. The rack and pinion reciprocally moves the lifter shaft 39 according to rotation of the release shaft 53.

The lifter shaft 39 is connected to the pressure plate 36 of the clutch apparatus 26 via a spring washer 36a (see FIG. 11). The lifter shaft 39 and the pressure plate 36 are integrally configured so as to be capable of reciprocal movement. Accordingly, when the lifter shaft 39 is moved rightward, the pressure plate 36 is moved (lifted) rightward against a biasing force of the clutch spring 37. Accordingly, the clutch apparatus 26 releases frictional engagement of the stacked clutch plates 35. Accordingly, the normally closed clutch apparatus 26 is in a disconnected state in which power transmission is impossible. When the lifter shaft 39 is moved leftward, the pressure plate 36 is moved rightward by a deflection extent of the spring washer 36a. Accordingly, in addition to the biasing force of the clutch spring 37, the spring washer 36a presses the pressure plate 36 rightward. Frictional engagement between the clutch plates 35 is strengthened. That is, a clutch capacity of the normally closed clutch apparatus 26 is increased.

<Clutch Control Mode>

Figure 4:
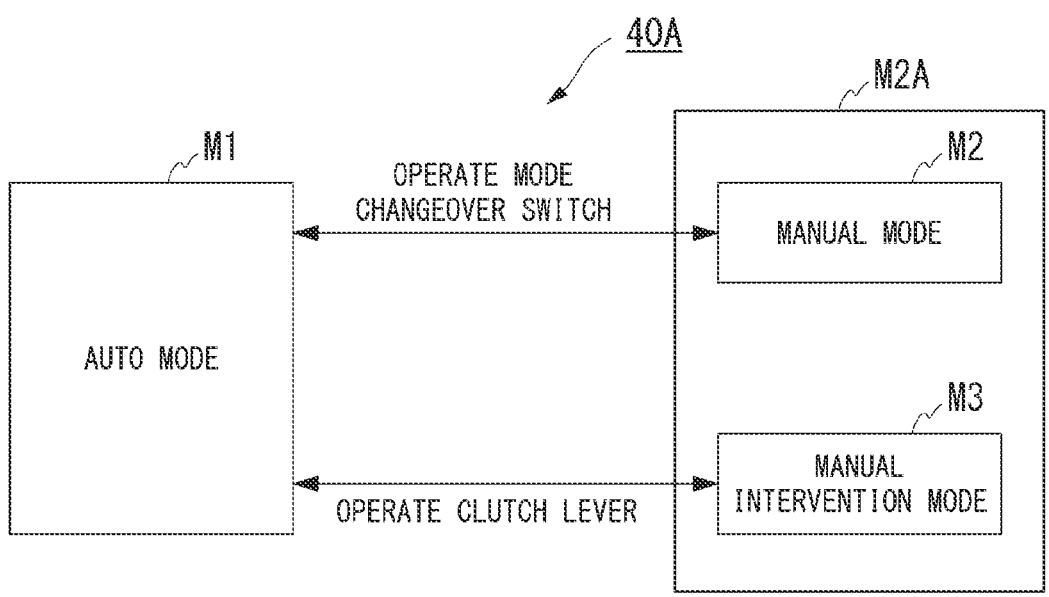
FIG. 4 is a view for describing transition of a clutch control mode of the motorcycle.

As shown in FIG. 4, a clutch control device 40A of the embodiment has three types of clutch control modes. The clutch control mode has an auto mode M1 of performing automatic control, a manual mode M2 of performing a manual operation, and a manual intervention mode M3 of performing a temporary manual operation. The clutch control mode is appropriately transitioned according to operations of a clutch control mode changeover switch 49 (see FIG. 3) and the clutch operator between the three types of modes. Further, an object containing the manual mode M2 and the manual intervention mode M3 is referred to as a manual system M2A.

The auto mode M1 is a mode of calculating a clutch capacity appropriate for a traveling state and controlling the clutch apparatus 26 according to automatic departure and gear shifting control. The manual mode M2 is a mode of calculating a clutch capacity and controlling the clutch apparatus 26 according to a clutch operation instruction by an occupant. The manual intervention mode M3 is a mode of receiving a clutch operation instruction from an occupant in the auto mode M1, calculating a clutch capacity from the clutch operation instruction and controlling the clutch apparatus 26, which is a temporary manual operation mode. Further, for example, when a state in which the occupant stops the operation of the clutch operator (a completely released state) is maintained for a prescribed time during the manual intervention mode M3, it may be set to return to the auto mode M1.

For example, the clutch control device 40A starts control from the clutch ON state (connected state) in the auto mode M1 when the system starts. In addition, the clutch control device 40A is set to return to the clutch ON in the auto mode M1 when the engine 13 is stopped (during the system OFF). In the normally closed clutch apparatus 26, during the clutch ON, there is no electric power supply to the motor 52 of the clutch actuator 50. Meanwhile, in the clutch OFF state (disconnected state) of the clutch apparatus 26, electric power supply to the motor 52 is held.

The auto mode M1 basically performs clutch control automatically. The auto mode M1 allows the motorcycle 1 to travel with no lever operation. In the auto mode M1, the clutch capacity is controlled on the basis of the throttle opening, the engine rotational frequency, the vehicle speed, the shift sensor output, and the like. Accordingly, the motorcycle 1 can be started without engine stall (meaning engine stop or engine stall) with a throttle operation only. In addition, the motorcycle 1 can be shifted only by a shift operation. In addition, in the auto mode M1, it is switched to the manual intervention mode M3 when the occupant grips the clutch lever. Accordingly, it is possible to switch off the clutch apparatus 26 arbitrarily.

Meanwhile, in the manual mode M2, the clutch capacity can be controlled by the lever operation of the occupant (i.e., the clutch apparatus 26 can be connected and disconnected. The auto mode M1 and the manual mode M2 can be switched to each other. This switching is performed by, for example, operating the clutch control mode changeover switch 49 (see FIG. 3) during stopping of the motorcycle 1 and neutral of the gearbox 21. Further, the clutch control device 40A may include an indicator showing that the lever operation is effective during transition to the manual system M2A (the manual mode M2 or the manual intervention mode M3).

The manual mode M2 is based on manual clutch control. The manual mode M2 can control the clutch capacity according to the operation angle of the clutch lever (and an operation angle of the driven clutch lever 54). Accordingly, it is possible to control the connection/disconnection of the clutch apparatus 26 according to the intention of the occupant. Further, even in the manual mode M2, the clutch control can be automatically intervened when the shift operation is performed without clutch operation. Hereinafter, the operation angle of the driven clutch lever 54 is referred to as a driven clutch lever operation angle.

In the auto mode M1, connection/disconnection of the clutch apparatus 26 is automatically performed by the clutch actuator 50. Here, by performing the manual clutch operation with respect to the clutch lever, it is possible to temporarily intervene the manual operation in the automatic control of the clutch apparatus 26 (the manual intervention mode M3).

<Manual Clutch Operation>

In the motorcycle 1 shown in FIG. 1, a clutch lever (not shown) as a clutch manual operator is attached to a base end side (an inner side in the vehicle width direction) of a left grip of the steering handle 4a.

Referring also to FIG. 2, the clutch lever is connected to the driven clutch lever 54 attached to the release shaft 53 of the clutch apparatus 26 via an operation cable (not shown). The driven clutch lever 54 is integrally rotatably attached to an upper end portion of the release shaft 53 protruding from the upper portion of the right cover 17a.

In addition, for example, the clutch control mode changeover switch 49 (see FIG. 3) is provided on a handle switch attached to the steering handle 4a. Accordingly, during the normal operation, the occupant can easily switch the clutch control mode.

<Clutch Actuator>

As shown in FIG. 1, the clutch actuator 50 is attached to a rear upper portion of the right cover 17a on the right side of the crank case 15.

Referring also to FIG. 5 and FIG. 6, the clutch actuator 50 includes the motor 52, and the speed reduction mechanism 51.

The motor 52 is, for example, a DC motor with the release shaft 53 parallel to the axial direction. The motor 52 has a driving shaft 55 disposed to protrude upward. The speed reduction mechanism 51 transmits a driving force of the motor 52 to the release shaft 53.

In the embodiment, a plurality of (two) motors 52 are provided with respect to a signal clutch actuator 50. Hereinafter, the motor 52 located on a side of the clutch actuator 50 in the front of the vehicle is referred to as a first motor 521, and the motor 52 located on a side of the first motor 521 in the rear of the vehicle and an inner side in the vehicle width direction is referred to as a second motor 522. Lines C01 and C02 in the drawings indicate center axes (driving axes) of the motors 521 and 522, respectively. For convenience of description, both the motors 521 and 522 may be collectively referred to as the motor 52. In addition, both the axes C01 and C02 are collectively referred to as an axis C0.

The speed reduction mechanism 51 decelerates the rotational moving force output from the motor 52 and transmits it to the release shaft 53. The speed reduction mechanism 51 has, for example, a gear train with the release shaft 53 parallel to the axial direction. The speed reduction mechanism 51 includes a driving gear 55a, a first idle gear 57a, a first small diameter gear 57b, a second idle gear 58a, a second small diameter gear 58b, a driven gear 63a, and a gear case 59.

The driving gear 55a is provided integrally with the driving shaft 55 of each of the motors 521 and 522. The first idle gear 57a is meshed with each of the driving gears 55a. The first small diameter gear 57b is provided coaxially with the first idle gear 57a. The second idle gear 58a is meshed with the first small diameter gear 57b. The second small diameter gear 58b is provided coaxially with the second idle gear 58a. The driven gear 63a is meshed with the second small diameter gear 58b. The gear case 59 accommodates each gear.

The first idle gear 57a and the first small diameter gear 57b are integrally rotatably supported by a first support shaft 57c. The first idle gear 57a, the first small diameter gear 57b and the first support shaft 57c constitute a first idle shaft 57. The second idle gear 58a and the second small diameter gear 58b are integrally rotatably supported by a second support shaft 58c. The second idle gear 58a, the second small diameter gear 58b and the second support shaft 58c constitute a second idle shaft 58. Each of the first support shaft 57c and the second support shaft 58c is rotatably supported by the gear case 59. The second idle gear 58a is a sector gear about the second support shaft 58c. The second idle gear 58a is provided to spread forward from the second support shaft 58c and outward in the vehicle width direction. Line C1 in the drawings is referred to as a center axis of the first idle shaft 57, and line C2 is referred to as a center axis of the second idle shaft 58.

The driven gear 63a is integrally rotatably provided on the release shaft 53. The driven gear 63a is a sector gear about the release shaft 53. The driven gear 63a is provided to spread forward from the release shaft 53. A downstream-side gear in the speed reduction mechanism 51 has a small rotation angle. For this reason, the second idle gear 58a and the driven gear 63a may be sector gears with a small rotation angle.

As a result, the speed reduction mechanism 51 and the clutch actuator 50 can be reduced in size.

That is, even when a large-diameter reduction gear is provided in order to increase the reduction ratio, the following effects can be obtained by cutting out areas other than the meshing range of the reduction gear to form a fan shape. That is, in particular, it is possible to suppress overhanging of the speed reduction mechanism 51 to the outer side in the vehicle width direction, and to achieve weight reduction of the speed reduction mechanism 51.

With such a configuration, the motor 52 and the release shaft 53 can always be interlocked via the speed reduction mechanism 51. Accordingly, a system configured to directly connect and disconnect the clutch apparatus 26 is constituted by the clutch actuator 50.

Each gear is a flat spur gear with a reduced thickness in the axial direction, and the gear case 59 is also formed in a flat shape with a reduced thickness in the axial direction. Accordingly, the speed reduction mechanism 51 becomes less noticeable when viewed from the side of the vehicle. A first rotation angle sensor 57d and a second rotation angle sensor 58d are provided on an upper surface side of the gear case 59. The first rotation angle sensor 57d and the second rotation angle sensor 58d are connected to one end portions of the first idle shaft 57 and the second idle shaft 58 to detect rotation angles thereof, respectively.

The motor 52 is disposed to protrude downward from the front portion of the gear case 59. Accordingly, the motor 52 can be disposed as described below. That is, a bulging portion 17b (see FIG. 1) that covers the clutch apparatus 26 in the right cover 17a can be disposed forward to avoid it. For this reason, outward overhanging of the clutch actuator 50 in the vehicle width direction is suppressed.

Referring to FIG. 1, FIG. 5 and FIG. 6, the clutch actuator 50 is disposed such that the motor 52 and the release shaft 53 are aligned in the vehicle forward/rearward direction. The lifter shaft 39 of the clutch apparatus 26 is disposed between the motor 52 and the release shaft 53 (an intermediate position of the clutch actuator 50) in the vehicle forward/rearward direction. The lifter shaft 39 is disposed at an axial center of the clutch apparatus 26, and the clutch actuator 50 has an element of a front portion (around the motor 52) and an element of a rear portion (around the release shaft 53), which are distributed on both front and rear sides of the axial center of the clutch apparatus 26.

A driving force of the motor 52 is decelerated as described below and transmitted to the release shaft 53. That is, the driving force of the motor 52 is decelerated between the driving gear 55a and the first idle gear 57a, decelerated between the first small diameter gear 57b and the second idle gear 58a, and further decelerated between the second small diameter gear 58b and the driven gear 63a.

<Release Shaft>

Figure 7:
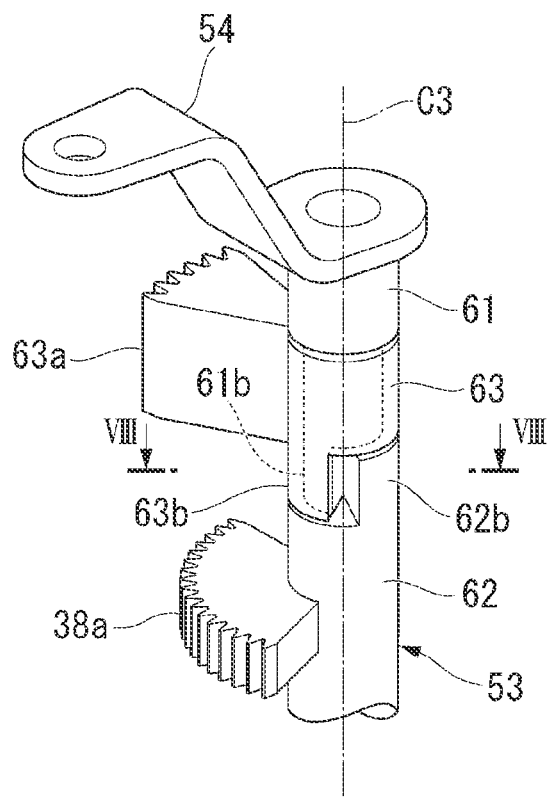
FIG. 7 is a perspective view of a release shaft that operates a clutch apparatus.
Figure 8:
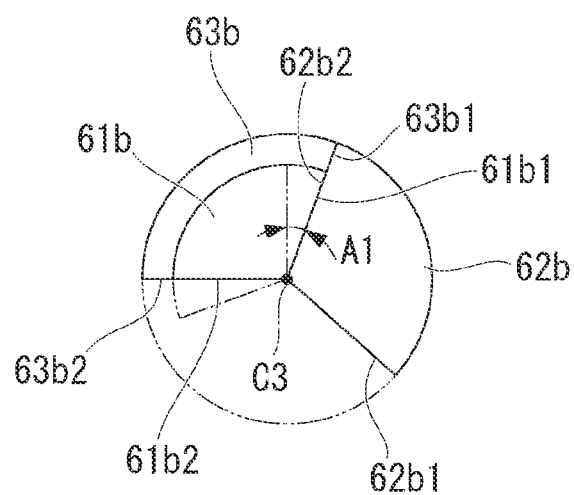
FIG. 8 is a cross-sectional view along line VIII-VIII in FIG. 7.

As shown in FIG. 6 to FIG. 8, the release shaft 53 is divided into a plurality of elements in order to individually receive the input from the clutch actuator 50 and the input from the operation of the occupant to be pivotable.

The release shaft 53 includes an upper release shaft 61 that constitutes an upper portion, a lower release shaft 62 that constitutes a lower portion, and an intermediate release shaft 63. The intermediate release shaft 63 is disposed to bridge between a lower end portion of the upper release shaft 61 and an upper end portion of the lower release shaft 62.

The upper release shaft 61 is formed in a columnar shape. The upper release shaft 61 is rotatably supported by an upper boss portion 59b of the gear case 59. The upper release shaft 61 has an upper end portion that protrudes outward from the gear case 59. The driven clutch lever 54 is integrally rotatably supported by the upper end portion of the upper release shaft 61. A return spring 54s is attached to the driven clutch lever 54. The return spring 54s applies a biasing force in a direction opposite to pivotal movement by the operation of the clutch operator (pivotal movement in a clutch disconnecting direction) to the driven clutch lever 54.

The lower release shaft 62 is formed in a columnar shape. The lower release shaft 62 has a lower portion rotatably supported inside the right cover 17a. The lower portion of the lower release shaft 62 faces inside the gear case 59. The driving gear 38a of the release mechanism 38 is formed on the lower portion. A lower return spring 62s is attached to the lower end portion of the lower release shaft 62. The lower return spring 62s applies a biasing force in a direction opposite to the pivotal movement in the clutch disconnecting direction to the lower release shaft 62.

A manual operation-side cam 61b extending in the axial direction with a fan-shaped cross section is provided on the lower end portion of the upper release shaft 61.

A clutch-side cam 62b extending in the axial direction with a fan-shaped cross section is provided on the upper end portion of the lower release shaft 62. The clutch-side cam 62b is provided in a range that avoids the manual operation-side cam 61b in the circumferential direction.

Figure 9A:
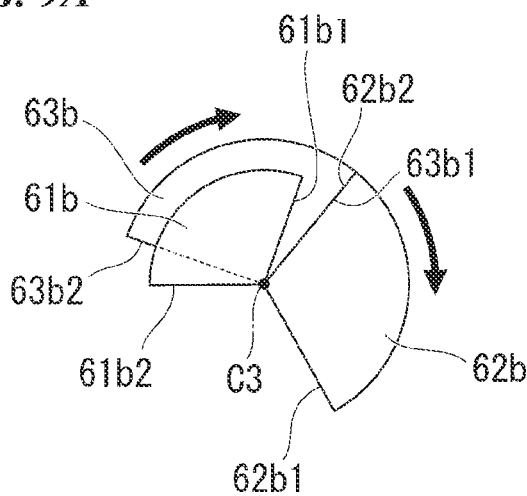
FIG. 9A is a cross-sectional view corresponding to FIG. 8 showing an action of the release shaft in a half clutch region during driving in the clutch actuator.
Figure 9B:
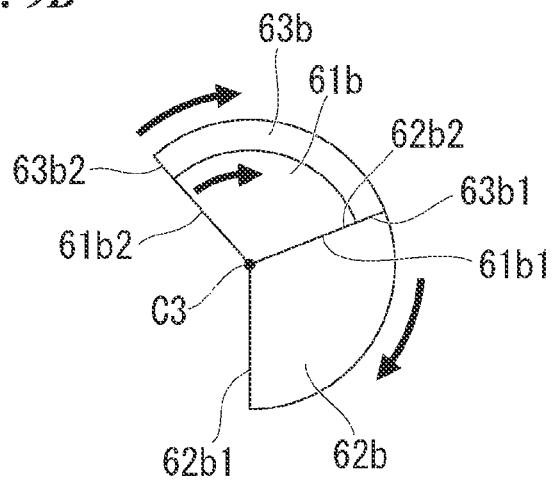
FIG. 9B is a cross-sectional view corresponding to FIG. 8 showing an action of the release shaft in the half clutch region during manual intervention.

The lower end portion (the manual operation-side cam 61b) of the upper release shaft 61 and the upper end portion (the clutch-side cam 62b) of the lower release shaft 62 overlap each other in the axial direction while avoiding each other in the circumferential direction. Accordingly, during the operation of the clutch operator, one side surface 61b1 of the manual operation-side cam 61b in the circumferential direction can press the other side surface 62b2 of the clutch-side cam 62b in the circumferential direction and rotate the lower release shaft 62 (see FIG. 9B). Rotation of the lower release shaft 62 at this time is referred to as normal rotation.

In the normally closed clutch apparatus 26, if there is no operation input (input to the disconnection side), the clutch capacity becomes 100%, and the clutch apparatus 26 maintains the connected state. Here, the one side surface 61b1 of the manual operation-side cam 61b in the circumferential direction does not press the other side surface 62b2 of the clutch-side cam 62b in the circumferential direction. Here, the manual operation-side cam 61b is spaced apart an angle A1 from the clutch-side cam 62b by the biasing force of the return spring 54s. Here, the driven clutch lever 54 is in a play state in which the manual operation-side cam 61b can move toward and away from the clutch-side cam 62b by the angle A1.

During normal traveling with no sudden acceleration in the motorcycle 1, the other side surface 61b2 of the manual operation-side cam 61b in the circumferential direction and one side surface 62b1 of the clutch-side cam 62b in the circumferential direction are separated from each other in the circumferential direction. Accordingly, when there is an input to the clutch-side cam 62b from the clutch actuator 50, the lower release shaft 62 can be rotated (normally rotated) independently from the upper release shaft 61 (see FIG. 9A).

The intermediate release shaft 63 is formed in a cylindrical shape. The intermediate release shaft 63 can be inserted through the engagement portion (upper and lower shaft engagement portions) of the lower end portion of the upper release shaft 61 and the upper end portion of the lower release shaft 62. The driven gear 63a can be integrally rotatably supported by the intermediate release shaft 63.

A control operation-side cam 63b extending in the axial direction with a fan-shaped cross section is provided on the intermediate release shaft 63.

The control operation-side cam 63b overlaps the clutch-side cam 62b in the axial direction while avoiding the clutch-side cam 62b of the lower release shaft 62 in the circumferential direction. Accordingly, during normal rotation of the clutch actuator 50, one side surface 63b1 of the control operation-side cam 63b in the circumferential direction can press the other side surface 62b2 of the clutch-side cam 62b in the circumferential direction to rotate (normally rotate) the lower release shaft 62 (see FIG. 9A).

In addition, the control operation-side cam 63b is disposed to avoid the manual operation-side cam 61b of the upper release shaft 61 in axial direction or the radial direction. Accordingly, when the input from the clutch actuator 50 can be transmitted to the clutch-side cam 62b, the lower release shaft 62 can be rotated independently from the upper release shaft 61. In addition, when there is a manual operation, the upper release shaft 61 can be rotated independently from the intermediate release shaft 63 on the control side.

The other side surface 63b2 of the control operation-side cam 63b in the circumferential direction and the one side surface 62b1 of the clutch-side cam 62b in the circumferential direction are separated from each other in the circumferential direction. Accordingly, when there is an input to the clutch-side cam 62b from a manual operation-side cam 63b, the lower release shaft 62 can be rotated (normally rotated) independently from the intermediate release shaft 63.

The normal rotation of the lower release shaft 62 is driven by the normal rotation of the clutch actuator 50 in addition to the manual operation. The clutch apparatus 26 can be actuated in the disconnecting direction via the release mechanism 38 by the normal rotation of the lower release shaft 62.

Meanwhile, in the embodiment, by reversing the lower release shaft 62 through reverse driving of the clutch actuator 50, it is possible to actuate the clutch apparatus 26 in the connecting direction via the release mechanism 38.

Figure 10:
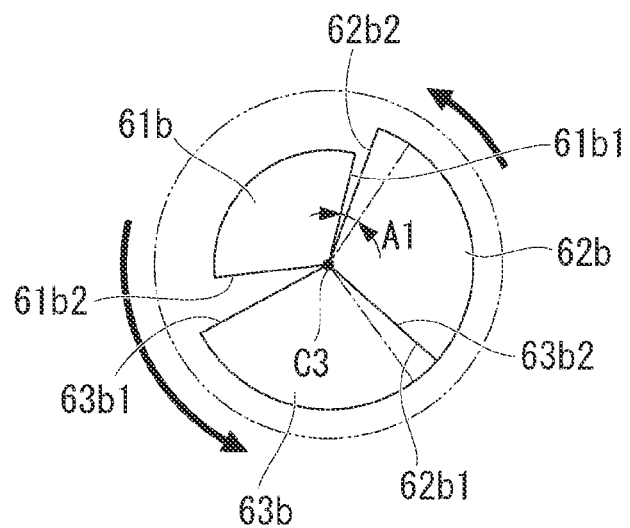
FIG. 10 is a cross-sectional view corresponding to FIG. 7 showing a state in which the clutch actuator is reversely driven to bias the clutch apparatus in a connecting direction.

As shown in FIG. 10, when the intermediate release shaft 63 is reversed through reverse driving of the clutch actuator 50, eventually, there are the following effects. That is, the other side surface 63b2 of the control operation-side cam 63b in the circumferential direction and the one side surface 62b1 of the clutch-side cam 62b in the circumferential direction abut each other in the circumferential direction. In this state, the other side surface 63b2 of the control operation-side cam 63b in the circumferential direction presses the one side surface 62b1 of the clutch-side cam 62b in the circumferential direction by applying the reverse rotation torque to the intermediate release shaft 63. Then, the lower release shaft 62 is reversely rotated within the range of the play the angle A1.

Accordingly, the lifter shaft 39 is moved in the clutch disconnecting direction and the reverse direction (connecting direction) via the release mechanism 38. By this movement, the spring washer 36a is deflected, and a biasing force corresponding to this deflection is applied to the pressure plate 36. Accordingly, the biasing force of the spring washer 36a, in addition to the biasing force of the clutch spring 37, is applied to the pressure plate 36. For this reason, the pressing force of the clutch plates 35 is increased to strengthen a frictional engaging force of the clutch apparatus 26. Accordingly, the clutch capacity of the normally closed clutch apparatus 26 can be increased.

This control is performed when a large torque is input to the clutch apparatus 26, for example, when sudden acceleration of the motorcycle 1 is detected, or the like. For this reason, no biasing force is added to the pressure plate 36 during normal traveling of the motorcycle 1 with little acceleration or deceleration. Accordingly, increases in output of the clutch actuator 50 and operation input of the occupant are suppressed. For this reason, as well as enabling a smooth clutch operation, the increase in size of the clutch actuator 50 can be suppressed.

Referring to FIG. 11, the clutch actuator 50 pivotably holds the upper release shaft 61 and the intermediate release shaft 63 with the gear case 59. The clutch actuator 50, including the upper release shaft 61 and the intermediate release shaft 63, constitutes an integrated actuator unit 50A. The lower release shaft 62 is rotatably held by the right cover 17*a*.

The power unit PU of the embodiment can be configured as follows for a manual clutch type power unit in which the connection/disconnection operation of the clutch apparatus 26 is not performed by electrical control but by the operation of the driver. That is, the power unit PU can be configured by replacing the right cover 17*a* and the release shaft 53 and retrofitting the actuator unit 50A. For this reason, the actuator unit 50A can also be attached to power units of different models. For this reason, a semi-automatic gear shifting system (automatic clutch type gear shifting system) can be easily configured by sharing the actuator unit 50A among multiple models.

As described above, the clutch control device according to the embodiment includes the clutch apparatus 26 configured to connect and disconnect power transmission between the engine 13 and the gearbox 21, the clutch actuator 50 configured to output a driving force for actuating the clutch apparatus 26, and the release mechanism 38 configured to receive the driving force of the clutch actuator 50 and actuate the clutch apparatus 26. The release mechanism 38 can also apply the driving force in either the disconnecting direction or the connecting direction to the clutch apparatus 26.

According to this configuration, by allowing the release mechanism 38 between the clutch actuator 50 and the clutch apparatus 26 to apply a driving force in either the disconnecting direction or the connecting direction to the clutch apparatus 26, the following effects are obtained. That is, for example, the clutch capacity can be increased by further applying the driving force in the connecting direction to the clutch apparatus 26 in the clutch connected state. For this reason, for example, when transmitting a large torque from the engine 13 to the gearbox 21 (when a clutch capacity higher than normal is required), or the like, it is possible to increase the clutch capacity in a limited manner. Accordingly, compared to using a clutch spring with a large load, the output of the clutch actuator 50 required for normal clutch disconnection can be suppressed. For this reason, the automatic clutch system can be configured efficiently, such as by achieving a reduction in size and weight of the clutch actuator 50.

In the above-mentioned clutch control device, the clutch actuator 50 applies the driving force in the clutch connecting direction to the clutch apparatus 26 during acceleration of the motorcycle 1.

According to this configuration, by increasing the clutch capacity during acceleration of the motorcycle 1, the sliding of the clutch apparatus 26 can be suppressed and a large torque can be transmitted. In normal times when the transmission torque is low, the output of the clutch actuator 50 required for clutch disconnection can be suppressed.

In the above-mentioned clutch control device, the release mechanism 38 includes the lower release shaft 62 on the side of the clutch actuator 50, and the lifter shaft 39 on the side of the clutch apparatus 26. The lower release shaft 62 is in constant mechanical engagement with the lifter shaft 39.

According to this configuration, the lower release shaft 62 on the side of the clutch actuator 50 and the lifter shaft 39 on the side of the clutch apparatus 26 in the release mechanism 38 are always meshed with each other. Accordingly, the driving force in the disconnecting direction and the connecting direction can be easily applied to the clutch apparatus by forward and reverse driving of the clutch actuator 50.

In the above-mentioned clutch control device, the release mechanism 38 constitute a rack and pinion configured to convert rotational movement of the lower release shaft 62 into reciprocal movement of the lifter shaft 39, and the pinion gear 38*a* included in the release mechanism 38 is formed in a fan shape when seen in the axial direction.

According to this configuration, the release mechanism 38 is easily constituted by the rack and pinion. The pinion gear 38*a* of the release mechanism 38 is a sector gear with a notched part in the circumferential direction. Accordingly, it is possible to achieve reduction in size of the release mechanism 38.

In the clutch control device, the clutch actuator 50 includes the motor 52 configured to output the driving force, and the speed reduction mechanism 51 configured to link the motor 52 and the clutch apparatus 26. The motor 52 and the lower release shaft 62 that is an output member of the speed reduction mechanism 51 are arranged in the vehicle forward/rearward direction. The lifter shaft 39 that is an input member of the clutch apparatus 26 is disposed between the motor 52 and the lower release shaft 62 in the vehicle forward/rearward direction.

According to this configuration, the input member (the lifter shaft 39) of the clutch apparatus 26 is disposed between the driving source (the motor 52) of the clutch actuator 50 and the output member (the lower release shaft 62), and thus, the following effects are provided. That is, in general, the input member is disposed at an axial center of the clutch apparatus 26. The driving source and the output member of the clutch actuator 50 are distributed and disposed on both sides of the input member sandwiched therebetween in the vehicle forward/rearward direction. Accordingly, the clutch actuator 50 can be disposed efficiently and in a well-balanced manner.

Further, the present invention is not limited to the above-mentioned examples. For example, the clutch operator is not limited to the clutch lever and may be a clutch pedal or other various operators. The clutch apparatus is not limited to being disposed between the engine and the gearbox, and may be disposed between the prime mover and an arbitrary output target other than the gearbox. The prime mover is not limited to the internal combustion engine and may be an electric motor.

It is not limited to an application to the saddle riding vehicle in which the clutch operation is automated, like the embodiment. For example, although it is based on the manual clutch operation, it is also applicable to saddle riding vehicles (so-called saddle riding vehicles equipped with clutch operationless transmission) that enable gear shifting by adjusting the driving force without manual clutch operation under predetermined conditions.

In addition, the saddle riding vehicle includes all vehicles in which the driver straddles the vehicle body, not only motorcycles (including bicycles with prime movers and scooter type vehicles), but also three-wheeled vehicles (in addition to vehicles with one front wheel and two rear wheels, vehicles with two front wheels and one rear wheel are also included) or vehicles with four wheels are also included, and vehicles that include an electric motor as a prime mover are also included.

Then, the configuration in the above-mentioned embodiment is an example of the present invention, and various modifications may be made without departing from the spirit of the invention.

BRIEF DESCRIPTION OF THE REFERENCE SYMBOLS

1: Motorcycle (saddle riding vehicle)
13: Engine (prime mover)
21: Gearbox (output target)
26: Clutch apparatus
38: Release mechanism
40: ECU (control unit)
40A: Clutch control device
50: Clutch actuator
50A: Actuator unit
51: Speed reduction mechanism (transmission mechanism)
52: Motor (driving source)
53: Release shaft

What is claim is:

1. A clutch control device comprising:
a clutch apparatus configured to connect and disconnect power transmission between a prime mover and an output target;
a clutch actuator configured to output a driving force for actuating the clutch apparatus; and
a driving mechanism configured to receive the driving force of the clutch actuator and actuate the clutch apparatus,
wherein the driving mechanism is able to apply the driving force in either a disconnecting direction or a connecting direction to the clutch apparatus,
the clutch actuator applies the driving force in a clutch connecting direction to the clutch apparatus according to an operation situation of the prime mover,
the clutch apparatus comprises a spring member configured to generate a pressing force in the clutch connecting direction,
the clutch actuator applies the driving force in the clutch connecting direction to the clutch apparatus by a driving source separate from the spring member, in addition to a biasing force of the spring member, only in a previously determined operation situation of the prime mover,
the driving mechanism comprises a first transmission member on a side of the clutch actuator and a second transmission member on a side of the clutch apparatus, and
the first transmission member is in constant mechanical engagement with the second transmission member.

2. The clutch control device according to claim 1, wherein the clutch control device is applied to a vehicle, and
the clutch actuator applies the driving force in the clutch connecting direction to the clutch apparatus during acceleration of the vehicle.

3. The clutch control device according to claim 1, wherein the driving mechanism constitutes a rack and pinion configured to convert rotational movement of the first transmission member into reciprocal movement of the second transmission member, and
a pinion gear included in the driving mechanism is formed in a fan shape when seen in an axial direction.

4. The clutch control device according to claim 1, wherein the clutch actuator comprises the driving source configured to output the driving force and a transmission mechanism configured to link the driving source and the clutch apparatus,
the driving source and the first transmission member that is an output member of the transmission mechanism are arranged in parallel in a first direction with their axial directions parallel to each other, and
the second transmission member that is an input member of the clutch apparatus is disposed between the driving source and the first transmission member in the first direction.

* * * * *